No. 876,697. PATENTED JAN. 14, 1908.
D. G. DAVIS.
LAWN MOWER GRASS RECEPTACLE.
APPLICATION FILED AUG. 6, 1907.
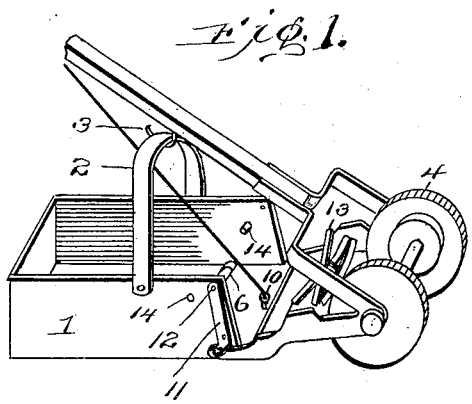
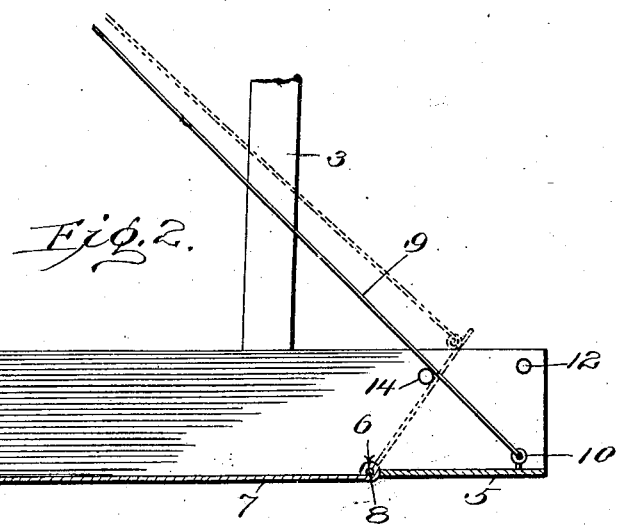
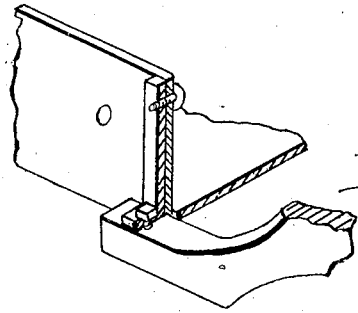
Inventor
David G Davis,
By Mason Fenwick & Lawrence,
his Attorneys
Witnesses
J. M. Fowler Jr
A. L. Kitchin

UNITED STATES PATENT OFFICE.

DAVID G. DAVIS, OF ELLENSBURG, WASHINGTON, ASSIGNOR OF ONE-HALF TO GEORGE R. BRADSHAW, OF ELLENSBURG, WASHINGTON.

LAWN-MOWER GRASS-RECEPTACLE.

No. 876,697.      Specification of Letters Patent.      Patented Jan. 14, 1908.

Application filed August 6, 1907. Serial No. 387,384.

*To all whom it may concern:*

Be it known that I, DAVID G. DAVIS, a citizen of the United States, residing at Ellensburg, in the county of Kittitas and State of Washington, have invented certain new and useful Improvements in Lawn-Mower Grass-Receptacles; and I do hereby declare the following to be a full, clear, and exact description of the invention, such as will enable others skilled in the art to which it appertains to make and use the same.

This invention relates to attachments for grass cutting machines and particularly to receptacles attached to lawn mowers for receiving the cut grass therefrom.

The invention comprises the production of a receptacle secured to a lawn mower, of any usual or preferred type, for receiving the cut grass therefrom.

The invention further comprises the production of a receptacle having part of its bottom at one end hinged, for receiving and forcing rearward cut grass.

The object in view in the production of the receptacle for receiving cut grass near one end and to force the same rearward as the occasion may require for at all times keeping the mower free from the cut grass in order that the mower knives may operate freely.

With these and other objects in view the invention comprises certain other novel constructions combinations and arrangements of parts which will be hereinafter more fully described and claimed.

In the accompanying drawing:—Figure 1 is a perspective view of a lawn mower with the present invention secured thereto. Fig. 2 is a section through a receptacle formed according to the present invention. Fig. 3 is a detail fragmentary view of one of the supporting members and surrounding mechanism showing how the receptacle is secured to a lawn mower.

In providing a receptacle for cut grass or the like for lawn mowers difficulty has been experienced in providing a receptacle for receiving the grass and holding the same away from the cutter. Numerous devices have been made, more or less successfully for receiving and keeping away from the cutter the grasses cut and it is to this class of devices that the present invention relates.

Referring more particularly to the accompanying drawing 1 indicates a receptacle of any desired shape preferably oblong and which is preferably made from sheet metal for providing a strong comparatively light receptacle. Provided at any convenient point along the receptacle is a handle or bail 2 designed to rest upon a hook 3 on the handle of the lawn mower 4. Near the front end of the receptacle 1 a door or grass receiving member 5 is provided which is hinged at 6 to the main bottom 7 of the receptacle 1. Preferably I make the bottom 7 and member 5 from the same piece of material and usually construct the same by simply cutting the bottom 7 at the hinge 6 and bending the same for forming a hinge at that point. A pivot 8 is inserted in the parts of the hinge for holding member 5 and bottom 7 together. A cord of any desired kind as 9 is secured at 10 to the movable bottom or member 5 as clearly seen in Fig. 1 for raising member 5 at any desired time upon its hinge 6. Suitably supporting members 11 are provided for securing or supporting the receptacle 1 to a lawn mower 4. The supporting members 11 are removably secured to the lawn mower 4 so that when receptacle 1 has been filled it may easily be removed and emptied. If desired the supporting members 11 may be pivotally mounted at 12 to receptacle 1 or rigidly secured as most desirable.

In operation as the lawn mower 4 is pushed across the yard and grass is cut the same is thrown upon member or bottom 5 in rather close proximity to cutters 13. In the course of time the grass would pile up or fill that end of the receptacle and choke or retard operation of cutters 13 if the same were not removed by some means. In order to provide an easy, quick removal it is only necessary to pull upon cord 9 and all the cut grass on member 5 will be raised and forced toward the rear of the receptacle 1. Preferably the cord 9 is pulled quickly so that member 5 will strike stop 14 with some force. This of course will suddenly stop the movement of member 5 but the grass has by this time received momentum sufficient to carry it to the rear of the receptacle 1. After the bottom 5 has struck stop 14 it is again permitted to fall to its normal position as seen in Fig. 2 ready to receive other cut grass. This operation can be done while the mower 4 is being operated without any appreciable loss of cut grass. By suddenly pulling the string 9 the grass on member 5 is in a certain sense pushed to the rear. By this means a device is provided that almost continuously feeds the cut grass away from the cutters 13 and the other mechanism of the mower 4 and consequently there is no opportunity for clogging or retarding the operation of the mower.

What I claim is:—

1. The combination with a lawn mower of a receptacle, means for receiving cut grass from said mower, means for moving said grass receiving means, and a stop projecting from the side of said receptacle for limiting the movement of said grass receiving means.

2. The combination with a mower, of a receptacle, means for pivotally securing one end of said receptacle to said mower, means for supporting the other end of said receptacle, a movable member for receiving grass from said mower, means for moving said member, and means for stopping suddenly the movement of said member whereby the grass upon said member will be thrown into said receptacle.

In testimony whereof I affix my signature in presence of two witnesses.

DAVID G. DAVIS.

Witnesses:
G. WARD KEMP,
L. C. MASSIE.